United States Patent [19]

Kanamaru et al.

[11] Patent Number: 4,915,616
[45] Date of Patent: Apr. 10, 1990

[54] SYSTEM UTILIZING GAS FLAME FOR APPRECIATION OR ORNAMENTATION

[75] Inventors: Toshihisa Kanamaru; Shinichi Ito, both of Fukuoka, Japan

[73] Assignee: Saibu Gas Co., Fukuoka, Japan

[21] Appl. No.: 165,997

[22] PCT Filed: May 18, 1987

[86] PCT No.: PCT/JP87/00313
§ 371 Date: Jan. 13, 1988
§ 102(e) Date: Jan. 13, 1988

[51] Int. Cl.$^4$ ............................................. F23Q 2/32
[52] U.S. Cl. ..................................... 431/126; 431/208
[58] Field of Search ......................... 431/126, 125, 208

[56] References Cited

U.S. PATENT DOCUMENTS 2,858,729 11/1958 Keyes .
3,806,250 4/1974 George .
4,042,313 8/1977 Pierce .
4,125,225 11/1978 Venchiattis .
4,220,413 9/1980 Targowski et al. .
4,255,121 3/1981 Sugimoto ............................ 431/208
4,367,042 1/1983 Smith, Jr. et al. ............ 431/126 X

FOREIGN PATENT DOCUMENTS 6113285 6/1984 Japan .

Primary Examiner—Larry Jones
Attorney, Agent, or Firm—Sandler, Greenblum & Bernstein

[57] ABSTRACT

A system to display a desired design or a pattern by means of a colored gas flame which is colored using a flame reaction of metallic substances in preparing a resonator to vibrate upon application of an electric current into an ultrasonic wave generator, atomizing a water solution of metallic chloride contained within an airtight container to a mist existing in a space above the water solution by means of the vibration of the resonator by using an ultrasonic wave launched from the resonator, and supplying the mist to a burner nozzle together with a fuel gas that contacts the mist with the flame.

17 Claims, 11 Drawing Sheets

SYSTEM UTILIZING GAS FLAME FOR APPRECIATION OR ORNAMENTATION

BACKGROUND OF THE INVENTION

1. Field of the Invention

This invention relates to an apparatus for generating a desirous shape and design by means of a colored gas flame by using the flame reaction of a metal.

2. Discussion of Background and Material Information

Japanese laid-open patent application SHO 61-13285 is related to the present invention in which an apparatus is used for appreciation or ornamentation is known.

The apparatus of the above laid open SHO 61-13285 has a feature to provide one or a plurality of burners formed so as to generate a desirous shape or design by means of a flame around the burner nozzle, a gas feeding pipe line to connect the burner to a gas feeding source, and a spray system for supplying a simple substance of metallic impalpable power or a compound of the impalpable powder with a mist shape within the gas feeding pipe line and arranged to connect with an intermediate portion of the above gas feeding pipe line. This enables color to form in the flame around the nozzle of the gas burner in response to the metallic impalpable powder, and further requires an unlimited increase in the number of the burners that are to be used. This system requires a spray system that requires a highly pressurized gas feeding pipe connected with the gas feeding pipe line in the upper stream of the burner or a main pipe line connected with one end of the mist generating pipe which is formed cylindrically in order to mix the mist shaped impalpable powder of the single substance of the metal or the compound substances into a fuel gas; arranging the spray nozzle which is provided at the end of the highly pressurized gas feeding pipe into the mist generating pipe along the axial direction of the pipe; connecting a suction pipe into an opening of the mist generating pipe which is opened in the surface of the pipe adjacent to the above spray nozzle; connecting the other end of the mist generating pipe with a mist injecting pipe line down stream of the gas burner; and insertig the suction pipe into a container which contains the metallic impalpable powder or water-soluble metallic chloride.

However, since the spray system described above is a complex structure, it tends to enlarge the whole system and also runs up high production costs. Further, it requires much labor to adjust the mist condition to a preferable state, and involves another problem of loading with a needle-valve.

Accordingly, it is a primary object of the present invention to solve the problems of the high cost and the complexity of mechanical maintenance involved with the prior art described above by simplifying the injecting means of the metallic components into the fuel gas with the mist state.

A further object of the present invention is to provide a system for appreciation or ornamentation which uses the gas flame with a system having a smaller size, lower cost and easy operation without any defects.

SUMMARY OF THE INVENTION

The present invention provides an airtight container that contains a water-soluble metallic chloride liquid with its gas existing within the space above the liquid surface, an ultrasonic wave generator having a resonator for the ultrasonic wave that is arranged with the above container to electrically generate the wave and a mist generator having a resonator of the ultrasonic wave for generating the wave into the water-soluble metallic chloride liquid so as to supply the mist to the pipe line.

According to the above-mentioned advantages of this invention, the function of mixing the metallic components into the fuel gas in the mist state is achieved by means of an extremely simple and compact type system, and it further provides a system for the appreciation of the ornamentation using an improved gas flame.

Further, in the combustion of the fuel gas with the burner, this invention adopts a red flame combustion method (with a lower ratio of premixture air) in the burner using the improved gas flame and incorporates the mist supplying pipe into the burner with the fuel gas feeding pipe.

Accordingly, this invention enables the use of the flame in the outdoors, even with a certain degree of wind.

Further, in the combustion of the fuel gas with the burner, this invention adopts the Bunsen flame type combustion method as its burner, using the improved gas flame, and incorporates the mist supplying pipe with the supplying pipe of the premixture air for the burner.

Accordingly, the burner of this invention can use larger nozzles to prevent the nozzle from being plugged by the unburned materials of the metallic chloride. Therefore, it becomes possible to use all types of city and LP gas.

Further, a plurality of the mist generators of the system can be provided using the improved gas flame in which the mist generators are arranged in parallel, wherein each airtight container of the mist generators contains a different kind of watr-soluble chloride liquid, and selective ones of the plurality of mist generators are operated.

According to the above, it is possible to change the shape or the design by means of the flame to continuously vary colors.

Further, in this invention, the resonator of the ultrasonic wave generator of the mist generator of the system for the appreciation or the ornamentation is provided at the bottom of the airtight container storing the water-soluble metallic chloride liquid, and the structure of the resonator is coated by titanic metal foil.

Further, in this invention, the mist generator serves both as the airtight container storing the water-soluble chloride liquid, and the above mist generator is combined with the airtight container and is floatingly housed within a larger airtight container filled with distilled water and where the resonator of the ultrasonic wave generator is arranged at the bottom of the larger airtight container in order to propagate the ultrasonic wave indirectly to the liquid stored within the other smaller floating airtight container.

Accordingly, this invention can prevent the corrosion of the resonator of the ultrasonic wave generator which contacts the water-soluble metallic chloride liquid.

BRIEF DESCRIPTION OF THE DRAWINGS

FIG. 1 is an embodiment using the red flame combustion method and FIG. 2 is a side elevation of an embodiment using the Bunsen flame combustion method.

DETAILED DESCRIPTION AND OPERATION OF THE INVENTION

Figure 1:
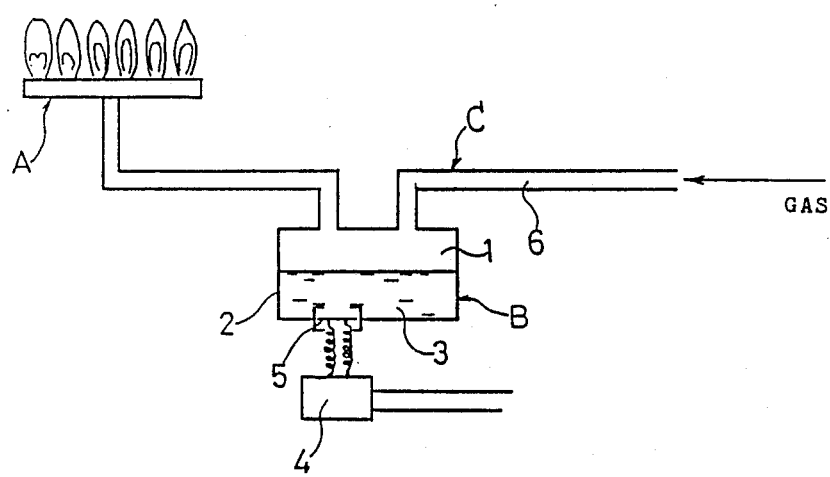
FIG. 1 and FIG. 2 show the basic principle of the system for the appreciation or ornamentation using the gas flame, where
Figure 2:
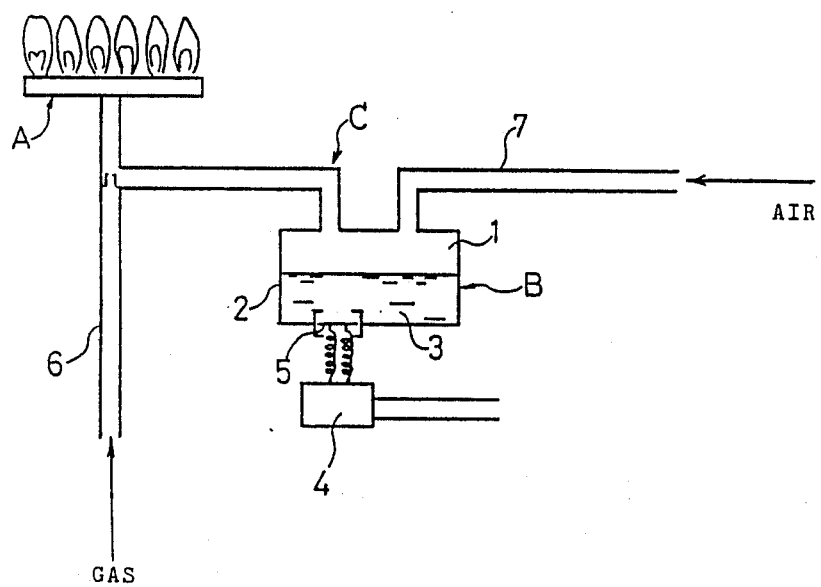

The present invention will be described in detail with reference to the accompanying drawings. FIG. 1 and FIG. 2 explain the basic principle of the appreciative or the ornamental system using the gas flame of the invention, wherein FIG. 1 shows a schematic illustration using the red flame combustion method and FIG. 2 shows using the Bunsen flame combustion method.

In both of the above-mentioned methods, a metallic liquid is changed to a metallic mist, i.e., the liquid of the water-soluble metallic chloride (3) stored within the airtight container (2) which has a space (1) above the liquid surface is changed to the mist made by means of the vibration of the resonator (5) of the ultrasonic wave generator (4) connected with an electrical source, the mist is introduced into the burner nozzle (A) together with the fuel gas through the pipe line of the mixture gas (C), wherein the metallic mist comes in contact with the burning flame.

As the basic structure using the red flame combustion method, as shown in FIG. 1, the mist generator (B) is connected with the fuel gas feeding pipe line (6) to feed the fuel gas into the gas burner (A), and by means of making the fuel gas pass through the mist-generating zone in the space (1) within the mist generator (B) thereof, it can mix the mist of the metallic chloride for the fuel gas directly to send it into the burning flame.

In the above structure and method, the fuel gas feeding pipe line (6) itself comprises the pipe line for supplying the mist of the water-soluble metallic chloride into the gas burner (A).

As shown in FIG. 2, the premixed gases including air and fuel gas are mixed together by connecting the fuel gas feeding gas pipe line (6), the mist generator (B) and the air supplying pipe line (7) to supply the air into said pipe line (6). The metallic mist is mixed with the air for making the air pass through the mist generating zone (1) of the mist generator (B) so that the metallic chloride is sent into the gas burner (A).

In the above structure and method, the air supplying pipe line for the premixing (7) comprises the pipe line (C) for supplying the mist of the water-soluble metallic chloride into the gas burner (A).

In both combustion methods, since the mist of the water-soluble metallic chloride blows out together with the fuel gas from the burner nozzle, the unburned material of the mist dries up and then sticks to the inside edge of the burner nozzle; i.e., since the red flame combustion burner has a smaller size nozzle, it is easily choked by the unburned material of the metallic chloride stuck around the nozzle edge, for example, therefore, the disadvantages of such type of burner are unavoidable compared to the other type of burner represented by the Bunsen flame combustion method.

On the other hand, however, it is not practical to use a burner in the outdoors unless the burner has a good flame stability even in windy environments (less than 5 m/sec.). Therefore, it is necessary to use the red flame type burner which has a comparatively good anti-wind ability if blowing wind upon the burner cannot be avoided because of design requirements. However, it is possible to arrange an antiwind baffle plate on the burner, such as a torch lamp, for example, or cover it with an anti-wind hood made of heat resistant glass.

Accordingly, as a first practical example of the present invention, the following embodiments for an exterior type will be explained in detail with reference to FIG. 3 through FIG. 6.

This first practical example is an exterior ornamental and display system. As shown in the drawings, it uses a number of gas burners for displaying the flowerage and leaves of the Hydrangea using gas flames. In this case, red flame type burners are used because anti-wind baffle plates are not available and the burner flames are open to the wind because of design requirements.

Figure 4:
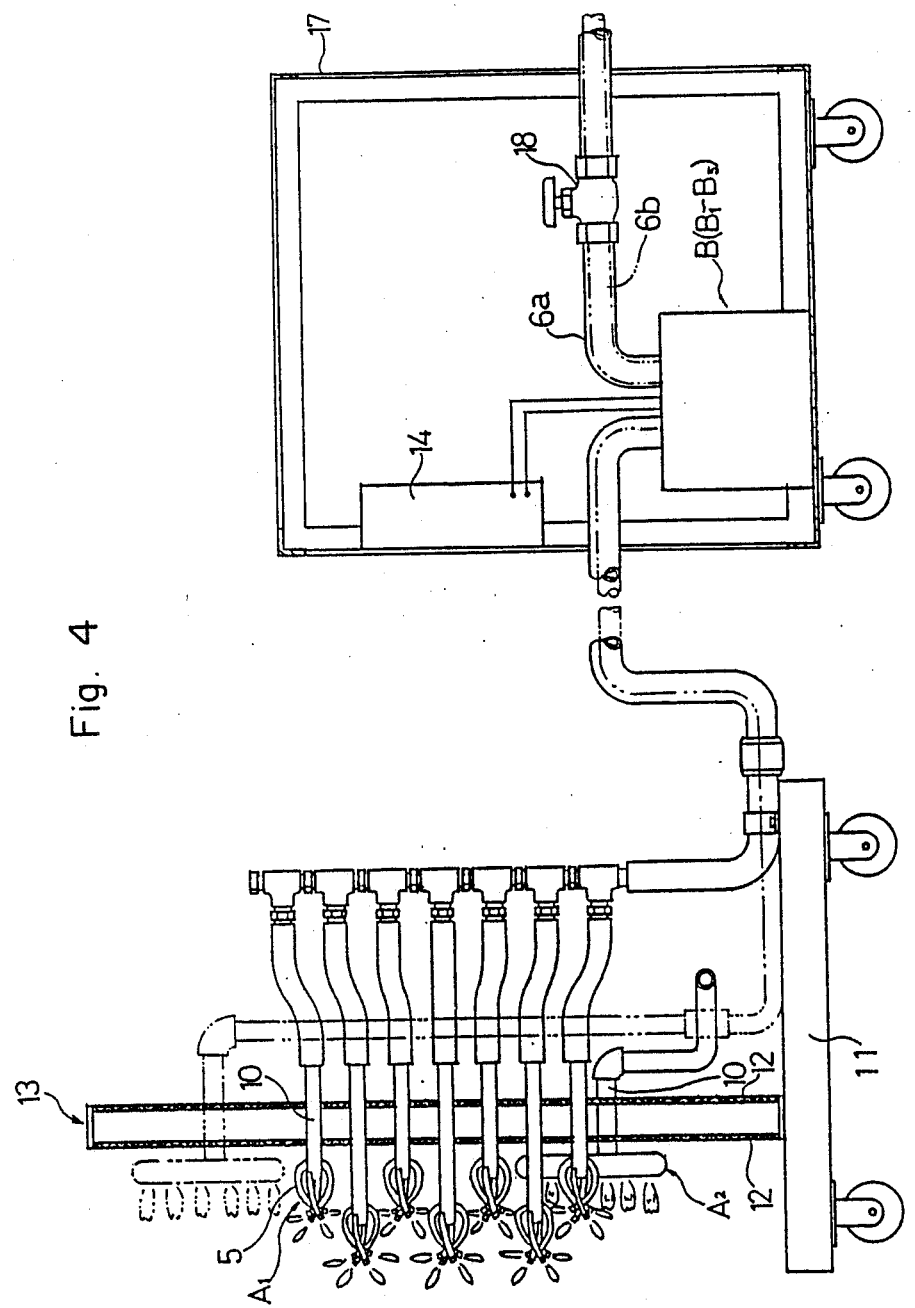
FIG. 4 is a side elevation of the system practiced in the outdoors which is based on the principle shown in FIG. 3.
Figure 5:
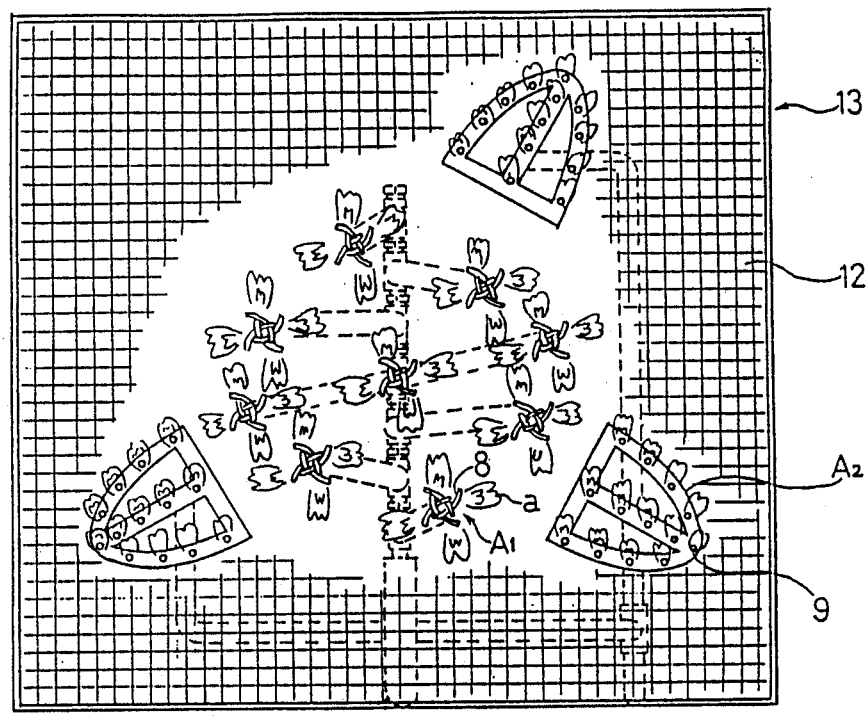
FIG. 5 is a front elevation of the burner part.
Figure 6:
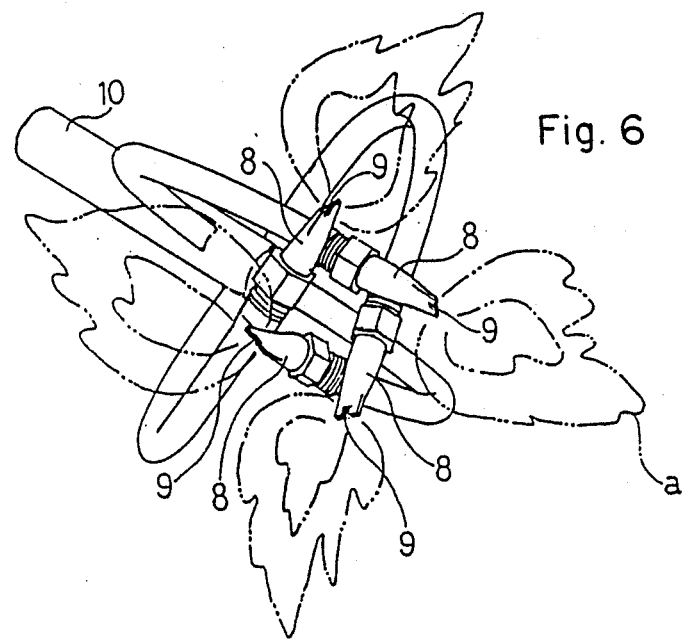
FIG. 6 is an enlarged front elevation of a burner for flowerage.

As shown in FIG. 4, FIG. 5 and FIG. 6, the burners (A) of the flowerage are formed of four burner nozzles (8), the burner group is formed to be able to display one of the flowerage by the flames (a) at the nozzle tips (9).

In FIG. 6, the flowerage burners ($A_1$) comprise four burners (8) which are fixingly welded into copper pipes (10) respectively, and as shown in FIG. 4, copper pipes (1) pass through burner holding member (13) and the double screens of wire net (12). There is a suitable space between both screens in which the burner holding member (13) is arranged in upright relation upon trolley (11), and as shown in FIG. 5, a plurality of the burners ($A_1$) are arranged collectively forming a mostly round shape in front view so as to display a piece of the Hydrangea's flower formed by the flames (a) of the burners ($A_1$) in the group.

It is possible to display a plurality of the Hydrangea if the burners (A) are arranged collectively in the mostly round shape.

On the other hand, as shown in FIG. 4 and FIG. 5, the burners ($A_2$) display the leaves of the flowerage by bending suitable pipes ($A_2$) to form the external shape of the leaves. A large number of gas nozzles (9) are drilled on the front surfaces of the pipes ($A_2$) in a row along the axial direction. The copper pipes (10) are passed through the burner holding member (13) and the double screens of the wire net (12).

The above flowerage burners ($A_1$) and the leave burners ($A_2$) are connected respectively with the end of different gas feeding pipe lines (6a) and (6b).

Figure 3:
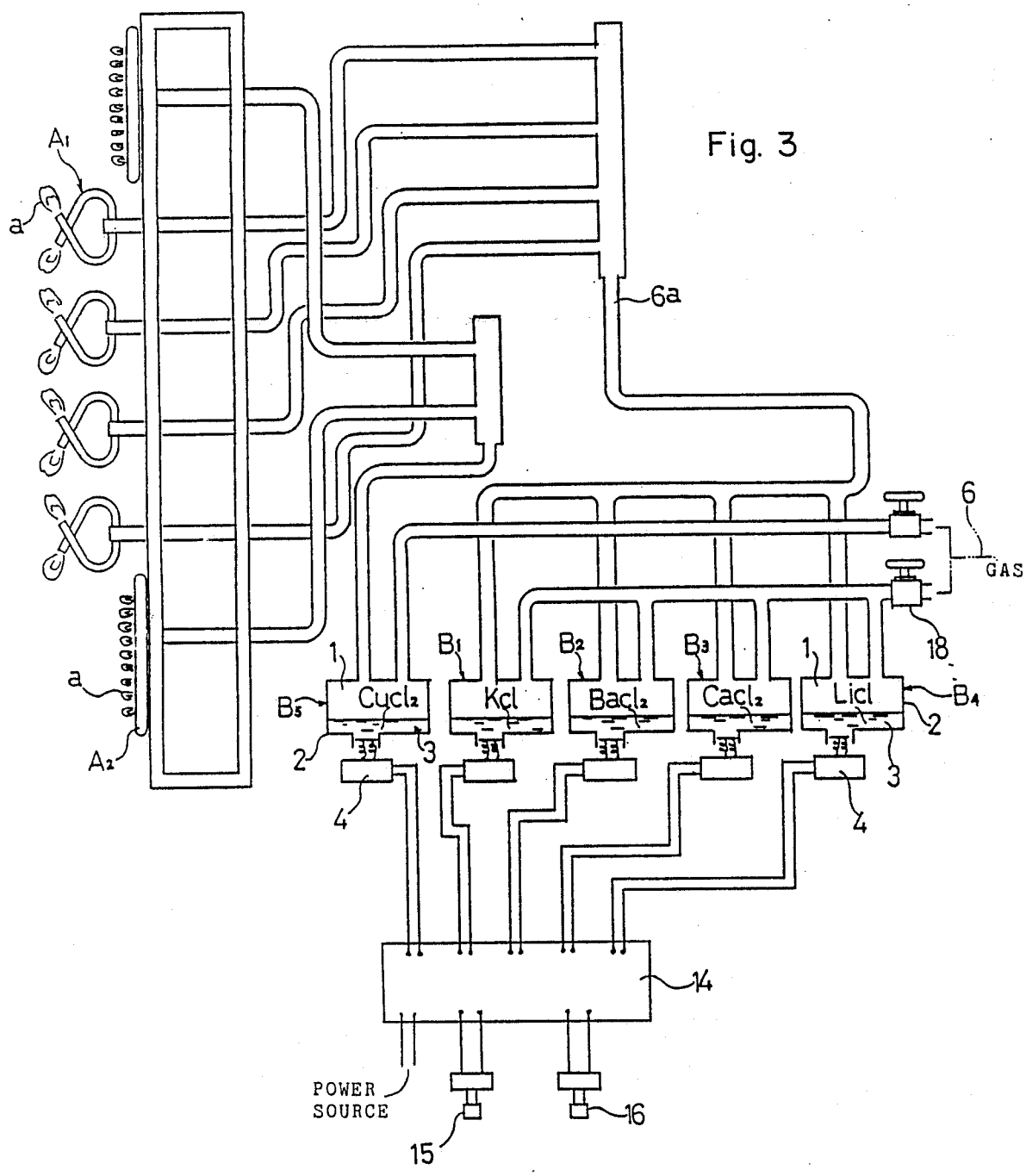
FIG. 3 shows a practical example of the prsent invention which practices the red flame combustion method outdoors.

In FIG. 3, the gas feeding pipe lines (6a) of the flowerage burners ($A_1$) are connected to four units of the mist generators ($B_1$) ($B_2$) ($B_3$) ($B_4$) in parallel, and the gas feeding pipe lines (6b) of the leaves burners ($A_2$) are connected to one unit of the mist generator ($B_5$).

Each of the mist generators ($B_1$–$B_5$) includes a resonator (5) connected with an electric ultrasonic wave generator (4) which is arranged at the bottom of the airtight container (2), which stores the liquid of the water-soluble metallic chloride, A space (1) exists above the liquid surface thereof. A high frequency current of about 1.7 MHz (Megahertz) is generated by ultrasonic wave generator (4) which is supplied with electric power, and makes the resonator (5) vibrate, by means of the ultrasonic wave generated by the resonance, thus causing air molecule, which are soluble nearly the surface of the liquid (3) to vibrate so as to cause air bubbles to occur. The bubbles break upon the liquid surface, thus generating the mist. Although it is not shown in the drawings, the surface of the resonator (5) is coated by titanic foil for preventing corrosion. Water solutions containing 10% of KCl, $BaCl_2$, $CaCl_2$ and CiCl are stored respectively into the containers (2) of mist generators ($B_1$) ($B_2$) ($B_3$) ($B_4$) and the airtight container ($B_5$) of the leave burner pipe lines (6b) stores a water solution containing 10% of $CuCl_2$.

The above gas feeding pipe lines (6a) of the flowerage burners ($A_1$) are connected with the airtight container (2) of the mist generator ($B_1$) ($B_2$) ($B_3$) and ($B_4$), and the gas feeding pipe lines (6a) are branched into four branched lines to connect the airtight containers (2) with the flowerage burners ($A_1$) so as to be able to supply the mixture gases into the flowerage burners ($A_1$) that pass through the space (1) of the airtight container ($B_1$) ($B_2$) ($B_3$) and ($B_4$). Gas feeding pipe lines (6a) are connected to the single pipe line (6a) downstream of the mist generators ($B_1$) ($B_2$) ($B_3$) and ($B_4$), the single pipe line (6a) branched into four pipe lines (6a) that are connected with each of the flowerage burners ($A_1$), respectively. On the other hand, the gas feeding pipe line (6b) of the leave burners ($A_2$) is connected to the airtight container (2) of the mist generator ($B_5$) so that mixture gases pass through the space (1) above the liquid, and pipe line (6b) is branched to meet with the preferable number of leaves burners (2) so as to supply the mixture gases into the leaves burners ($A_2$).

The ultrasonic wave generators (4) of each of the mist generators ($B_1$) ($B_2$) ($B_3$) ($B_4$) and ($B_5$) are preferably controlled by a control panel (14) having a microcomputer.

In the operation of the above system, for example, when the on-button (15) of the control panel (14) is pushed, the mist generator ($B_5$) continuously operates until the off-button (16) is pushed, and the mist generators ($B_1$) ($B_2$) ($B_3$) and ($B_4$) of the flowerage burners ($A_1$) are operated in a predetermined sequence.

Accordingly, the operation of the above display system or the illumination system consists of pushing the on-button (15) of the control panel (14), whereby in the leaves system, the electric power is supplied to the ultrasonic wave generator (4) of the mist generator ($B_5$), and thus causes a mist of the water solution containing $CaCl_2$ to occur. The mist is mixed into the fuel gas when it passes through the mist generator ($B_5$), and the mixture gas is supplied to the leaves burners ($A_2$).

Further, in the flowerage system, electric power is supplied to the ultrasonic wave generator (4) of No. 1 mist generator ($B_1$), and causes a mist of KCl containing the water solution to occur. The mist is mixed into the fuel gas of the gas feeding pipe line (6a) when it passes through No. 1 mist generator ($B_1$), and the mixture gas is supplied to the flowerage burner ($A_1$).

Accordingly, when the flowerage burners and the leaves burners ($A_1$) ($A_2$) are ignited, the gas flames of the leaves burners ($A_2$) are colored with a green color because of the flame reaction the design of the leaves by the green flame is displayed. In the flowerage burners ($A_1$), the flame is colored by a pink color because of the flame reaction of KCl, and it is able to display the design of the Hydrangea flowers by the pink colored flame.

Further, as shown in FIG. 4, the mist generators ($B_1$) ($B_2$) ($B_3$) ($B_4$) and ($B_5$), the ultrasonic wave generators (4) and the control panel (14) are housed collectively in a cabinet (17) with castors as a unit which is separate from the trolley (11) having the burners ($A_1$) ($A_2$). However, it is possible for the whole system to be on the trolley (11) without the cabinet with the castors. In FIG. 4, the (18) is a control valve to control the flow amount of the fuel gas.

Figure 7:
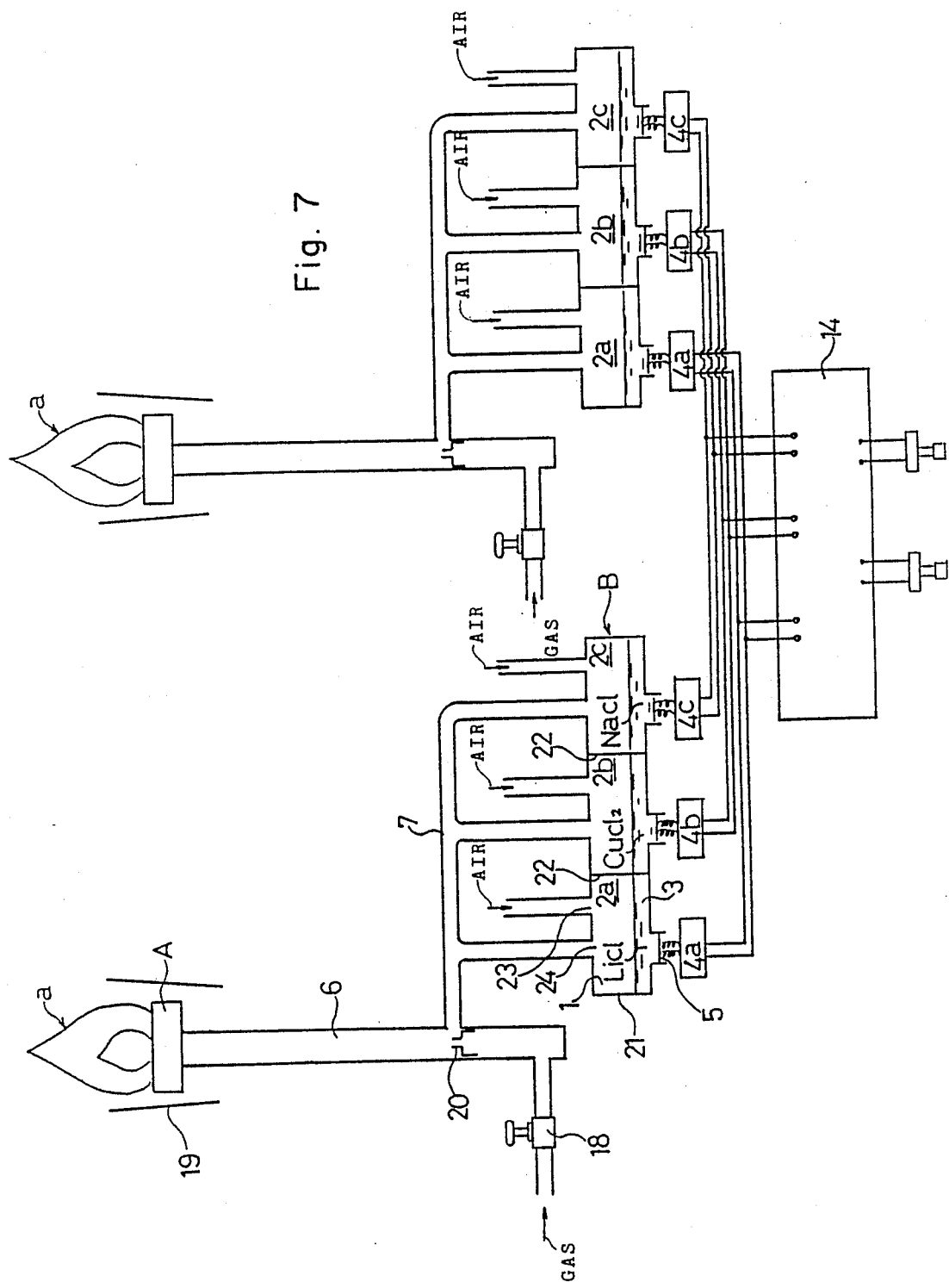
FIG. 7 is a schematic illustration showing a practical example of the torch lamp in the Bunsen flame combustion method.

In a second practical example of the present invention, the Bunsen flame combustion method in the outdoors is used as shown in FIG. 7.

In this case, it is possible to arrange an anti-wind baffle plate (19) so that it surrounds the gas burner (A) unless it interferes with sight to the design.

In FIG. 7, a torch lamp and the burner system are formed so that the gas feeding pipe line (6) is connected with the bottom of a short length cylindrical tube (A) in the center portion thereof and in which both the upper and the lower parts are blocked and a large number of gas nozzle pin-holes are drilled in the upper surface of the short length cylindrical tube (A) and surround the burner.

The gas feeding pipe lines (6) has a gas jetting orifice (20) in an intermediate portion of the line (6), and the premixing air supply pipe line (7) is connected to the portion adjacent to and down-stream from said gas jetting orifice (20).

The mist generators (B) each have air suction pipes on an upper ceiling portion, and each branched pipe (7) is connected with the upper ceiling portion as well as the air suction pipes and the branched pipes are branched from the premixing air supply pipe line (7). Because suction is generated by means of the Venturi effect around the gas jetting orifice (20) within the gas feeding pipe line (6), the premixing air supply pipe line (7) will suck an amount of the air in response to the above Venturi effect through the interior of the mist generator (B). The line (7) supplies the necessary air together with the mist. This air is premixed with the fuel gas which is also within the gas feeding pipe line (6) and it is sent into the burner (A) as the premixture gas.

The mist generator (B) comprises three units of No. 1, No. 2, and No. 3 airtight containers (2a) (2b) (2c) which are provided with a resonator (5) at the inside bottom of the above containers (2a) (2b) (2c), respectively, and also three units of ultrasonic wave generators (4a) (4b) (4c) having the resonators (5). Those three units of the airtight containers (2a) (2b) (2c) contain the water solution containing 10% of CiCl, $CuCl_2$ and NaCl and the existing space (1) above the liquid surface. The above three units of the airtight containers (2a) (2b) (2c) are formed by a larger container (21) that is divided into three compartments by partitions (22).

The air suction port (23) and the air delivery port (24) are arranged respectively upon the upper surface of each airtight container (2a) (2b) (2c), and the premixing air supply pipe line (7) is connected with each air suction port (23) and the air delivery port (24), so as to suck the air from the air suction port (23) and deliver it from the air delivery port (24), and those pipe lines which are connected with the air delivery port (24) are connected to one line to join with the gas feeding pipe line (6).

Further, the tail end of the above pipe lines which are connected with each air suction port (23) are opened to the atmosphere.

Accordingly, when electric power is supplied to the No. 1 ultrasonic wave generator (4a), the resonator (5) of No. 1 airtight container (2a) is resonated and a mist of the water solution containing CiCl occurs. The mist flows into the space (1) and is introduced into the gas feeding pipe line (6) after mixing with the air sucked from the atmosphere and the mixture gas blows out from the burner nozzle to contact the flames (a).

Therefore, the flames which arise around the burner nozzles will be colored red which is caused by the flame reaction with CiCl.

As above, when electric power is supplied to the No. 2 ultrasonic wave generator (4), mist of the water solution containing $CuCl_2$ occurs, and the mist is supplied to the burners (a). The flames are colored by the flame reaction caused by $CuCl_2$. In the same way, when electric power is supplied to the No. 3 ultrasonic wave generator (4c), the mist of the water solution containing NaCl occurs, and the mist is supplied to the burner (A) to color the flame (a) with the orange color caused by the flame reaction with NaCl. The supply of the electric power into each No. 1, No. 2, and No. 3 ultrasonic wave generator (4a) (4b) (4c) is sequentially controlled by means of the control panel (14).

Further, in FIG. 7, two units of the torch lamp having the above structure is shown. However, these two units of the torch lamp are controlled by one unit of the control panel (14).

The ultrasonic wave generator (4a) of No. 1 and No. 2 torch lamps is electrically wired into the power output terminal of the control panel (14) and also No. 3 or No. 4 ultrasonic wave generators, if any, will be wired into the same output terminal of he control panel (14). Therefore, each group, No. 1, No. 2 ultrasonic wave generators, for example, of the ultrasonic wave generator will operate in synchronization, i.e., the No. 1 and No. 2 touch lamps show the same flame color. It is also possible to change the individual flame color (a) of the No. 1 and No. 2 torch lamps by changing the connection order of the wiring into the power output terminal of the control panel (14), or by changing the pouring order of the liquid chemical into the airtight containers.

Further, it is also the user's option to increase the number of the torch lamps.

Figure 8:
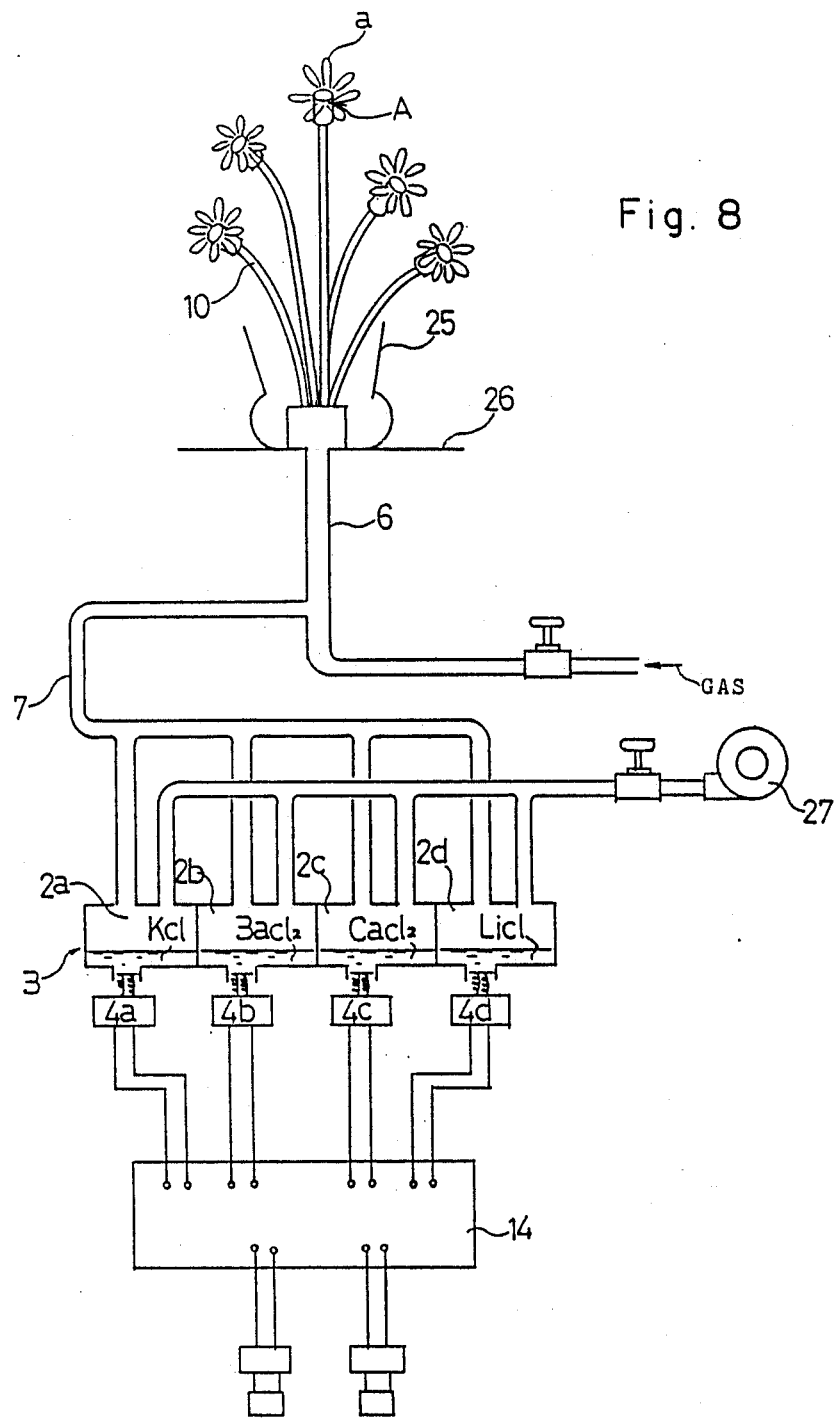
FIG. 8 is a schematic illustration showing a practical example of the ornamental system for the interior using the Bunsen flame combustion method.

A third practical example will be explained using the Bunsen flame combustion method in reference to FIG. 8 and FIG. 11. This example is similar to the second practical example disclosed above, however, the antiwind baffle plate is not needed because of interior use.

This practical example is one of the ornamental systems for the interior in which several flower arrangements put into a flower vase (25) are displayed. The end of the gas feeding pipe line is connected with the internal chamber within the flower vase (25) and passes through the bottom of the vase which is arranged on the table (26). The lower ends of several pipes (10) are connected with the upper surface of the chamber arranged within the vase (25), and the upper ends of the several pipes (10) are connected with smaller gas burners (A), respectively, in which the several pipe lines (A), respectively, are modeled upon the stalk shape of a flower. As shown in FIG. 11, burner (A) is formed in a cylindrical shape in which the axial direction is upright and the upper ceiling part of the burner (A) is blocked. The above burner (A) has several gas nozzles (9) arranged along the circumference at regular intervals so as to display the flower's petals by the flames (a).

The number of the gas nozzles (9) is equivalent to the number of the flower's petals, so that the increase or the decrease will be decided according to the kind of the flower.

Figure 11:
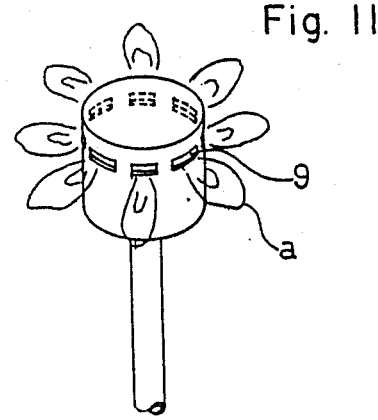
FIG. 11 is an enlarged perspective view of the burner.

Further, as shown in FIG. 11, eight gas nozzles with a slit shape are provided to display a flower having eight petals such as a Cosmos flower. However, twelve gas nozzles (9) with a round shape hole can be used so that it can display a Gerbera flower, and nine gas nozzles (9) with a longer slit shape along the circumference can display a cherry blossom.

The above gas feeding pipe line (6) is extended downwardly passing through the table (26) to connect with the premixing air supply pipe line (7) which is connected to the mist generator (B).

Figure 9:
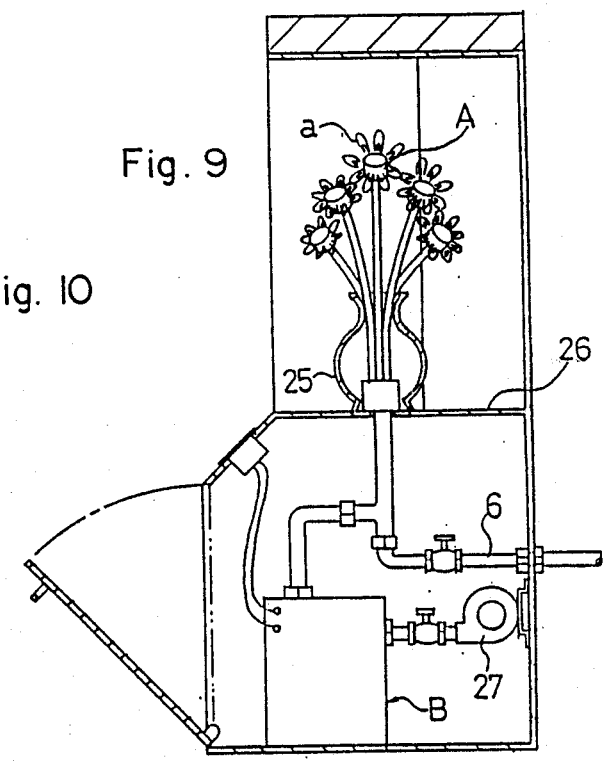
FIG. 9 is a cross-sectional view of the ornamental system for the interior which is based on the principle of FIG. 8.

The premixing air supply pipe line (7) has a comparatively low pressure blower (27) in the basal part of the pipe line, and the air blown by the blower (28) is introduced by the pipe line through the airtight container of the mist generator (B) into the gas feeding pipe line (6) (See FIG. 9).

The mist generator (B) provides four units of the airtight containers (2a) (2b) (2c) (2d) which contain the water solutions containing 0% of KCl, $BaCl_2$ $CaCl_2$, and CiCl, and also each of the airtight containers (2a) (2b) (2c) (2d) include a resonator (5) connected to each of the ultrasonic wave generators (4a) (4b) (4c) (4d), respectively. Electric power is supplied to an optional one of the ultrasonic wave generators (4a) (4b) (4c) (4d) which are connected to resonators (5). A mist of the water solution containing the metallic chloride stored within the airtight container occurs in response to the ultrasonic wave generators (4a) (4b) (4c) (4d).

By changing the order of the operation of those No. 1, No. 2, No. 3 and No. 4 ultrasonic wave generators (4a) (4b) (4c) (4d) by means of he control panel (14), it is possible to change the flame color of the Cosmos flower displayed by the gas nozzle (9) from pink to yellow, orange and red in order.

Figure 10:
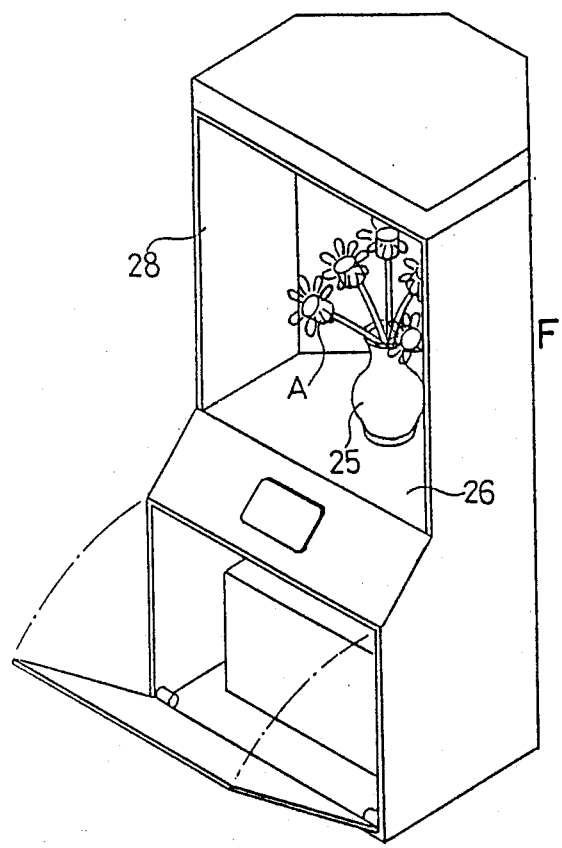
FIG. 10 is a perspective view of the example of FIGS. 8 and 9.

In FIG. 9 and FIG. 10, the table (26) under the vase (25) has a vase (28) opening upwardly in the front, and the lower part of the case (28) is closed. The vase (25) and the burner (A) are within the case (28), and the gas feeding pipe line (6), the premixing air supply pipe line (7), the blower (27) and the mist generator (B) are installed within the space under the table (26). And the space under the table (26) is provided with a closure or door for maintenance and inspection.

As shown in the first or second practical examples above, when the Bunsen flame combustion method is employed, the gas nozzle is not choked by unburned materials of the metallic chloride even in a short time because of the larger size of the gas nozzle.

Therefore, while the first practical example employing the red flame combustion method is suitable for a temporary use such as entertainment or a side show, for example, the Bunsen flame type can be used for a standing display because the gas nozzles are easier to wash by water one time per week or month and it is also easier to do maintenance work. Further, the red flame type needs fuel gas having a higher combustion speed (containing 40% to 60% of Hydrogen). The Bunsen flame type does not need gases having the higher combustion speed. Therefore, this Bunsen flame type has the advantage to be able to use any type of city gas of LP gas accordingly.

Figure 14:
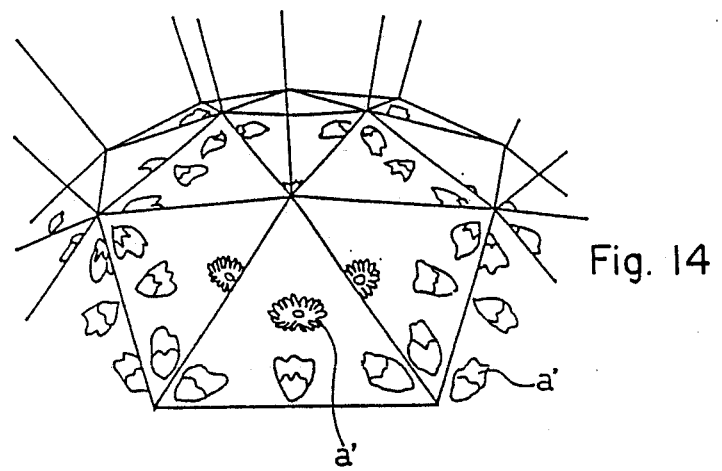
FIG. 14 is a schematic illustration showing the system when seen through a viewing window, the flowerage flames being reflected from cylindrical mirrors.
Figure 13:
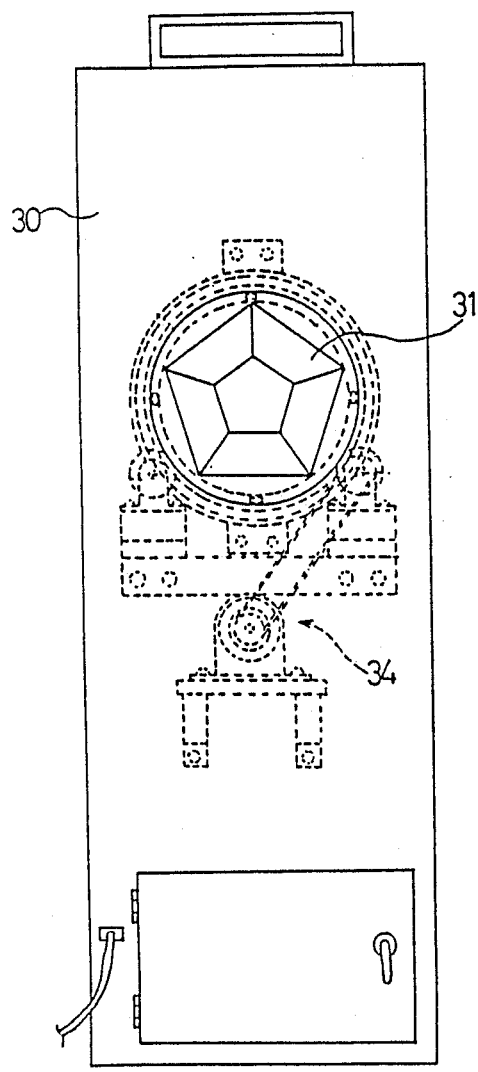
FIG. 13 is a front elevation of the system of FIG. 12.
Figure 12:
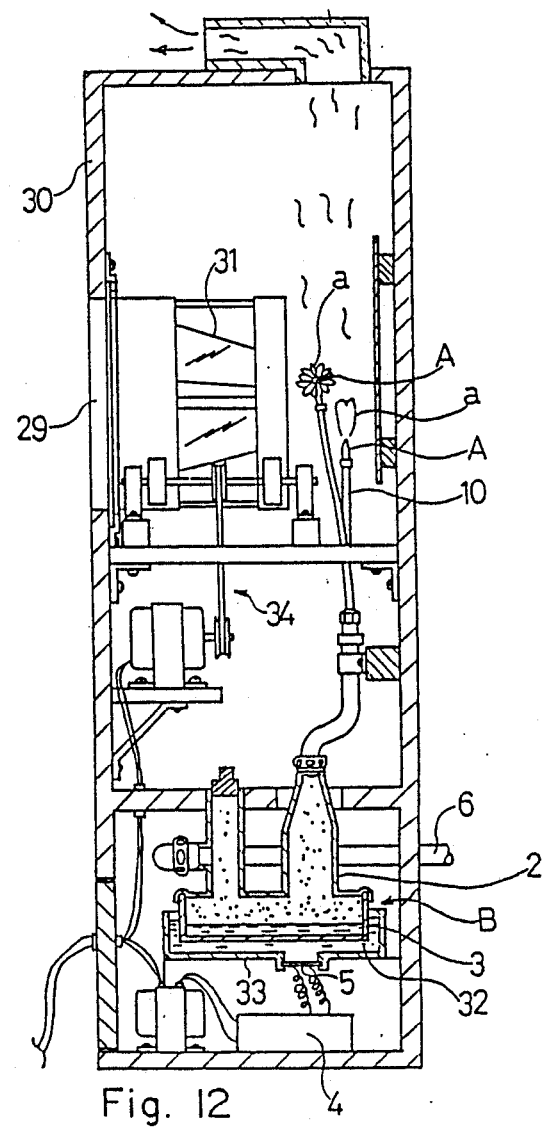
FIG. 12 is a cross-sectional view of the ornamental system featuring a kaleidoscope practicing the red flame combustion method.

FIG. 12 to FIG. 14 disclose the fourth practical example in which this invention is practiced in a Kaleidoscope system.

The Kaleidoscope system includes a cylindrical mirror (31) which is formed in a cylindrical shape having openings in both ends and is mounted within a dark box (30) having a peep window (29) in the front. The cylindrical mirror (31) is faced from the peep window (29) and one or a plurality of gas burners (A) is arranged to face with an opening of the cylindrical mirror (31) wherein the gas flames formed by the burner (A) are reflected in the mirror (31) and consist of a cylindrical shape which can be appreciated through the peep window (29). The burner (A) is connected to the gas feeding pipe line (6) through the pipe line (10) within the dark box (30), and the mist generator (B) is arranged at an intermediate portion of said gas feeding pipe line (6).

This Kaleidoscope system employs the red flame combustion method. However, it is of course optional to employ the Bunsen flame type method.

The type of mist generator used in this Kaleidoscope system is different from the formerly shown practical examples which arranged the resonators (5) directly on the bottom of the airtight containers (2). In contrast, in this Kaleidoscope system, the airtight containers (3) storing the water solution of the metallic chloride is floatingly arranged within a larger water container (33) that is filled with distilled water (32) and wherein the resonator (5) is arranged at the bottom of the water container (33).

Therefore, in the above indirect type of the mist generator (B), when the electric power is supplied to the ultrasonic wave generator (4), making the resonator resonate, an ultrasonic wave launched upwardly from the resonator (5) will reach the water solution of the metallic chloride (3) by passing through the distilled water (32) and the bottom of the airtight container (2). This makes the air molecule being formed adjacent to the water surface vibrate so as to form air bubbles wherein mist will be formed by the breaking of the bubbles upon the water surface.

In accordance with such a dual structure which includes the water container (33) filled by the distilled water (32) with the resonator (5) at the bottom and the airtight container (2) storing the water solution of the metallic chloride, the water solution of the metallic chloride does not contact the resonator (5) directly, so that it is not necessary to coat the surface of the resonator (5) with the titanic foil to protect the resonator from corrosion as shown in the former practical examples. This can lower the cost although this structure is somewhat more complex.

In this system, as with the former practical examples, the mist generators have different water solutions of the metallic chloride and the mist generators may operate by means of a timer. It is therefore possible to optionally and automatically change the flame color one after another and to change the type of burner, the form of the burner, the flame color and the timing of the change of the flame color.

Also, the end section of the cylindrical mirror (31) is formed as a pentagon and the edge length of the pentagon from the front toward the rear is gradually reduced.

Since the mirror surfaces of the cylindrical mirror (31), as shown in FIG. 14, appear as a semicircle shape or a dome shape, and the flame pattern (a') is reflected by the mirrors within the cylindrical mirror (31), the flame appears as solid body, i.e., in three dimensions.

Further, this practical example shown in FIGS. 12–14 includes a rotational means (34) to rotate the cylindrical mirror (31) to change the patterns reflected by he cylindrical mirror (31). The rotational means (34) can be moved by hand or by a motor as shown in the drawings.

Figure 15:
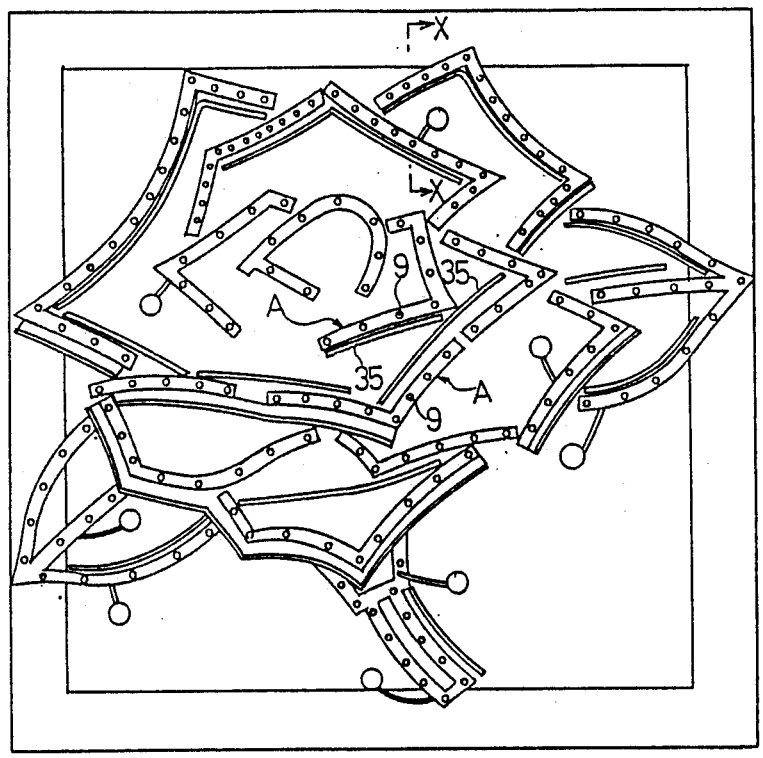
FIG. 15 is a front elevation showing an example of the burner to be used in this invention.
Figure 16:
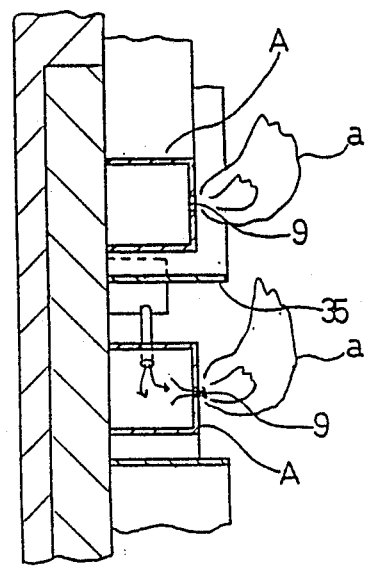
FIG. 16 is a detailed cross-sectional and enlarged view taken along line X—X in FIG. 15.

Further, when the system is vertically arranged and used in the interior, even through there is no influence of the wind, a gas flame can be blown out by the exhaust gasses from a lower positioned gas burner (A). It is therefore necessary to arrange baffle plates (35) between upper and lower burners as shown in FIG. 15 and FIG. 16.

Figure 17:
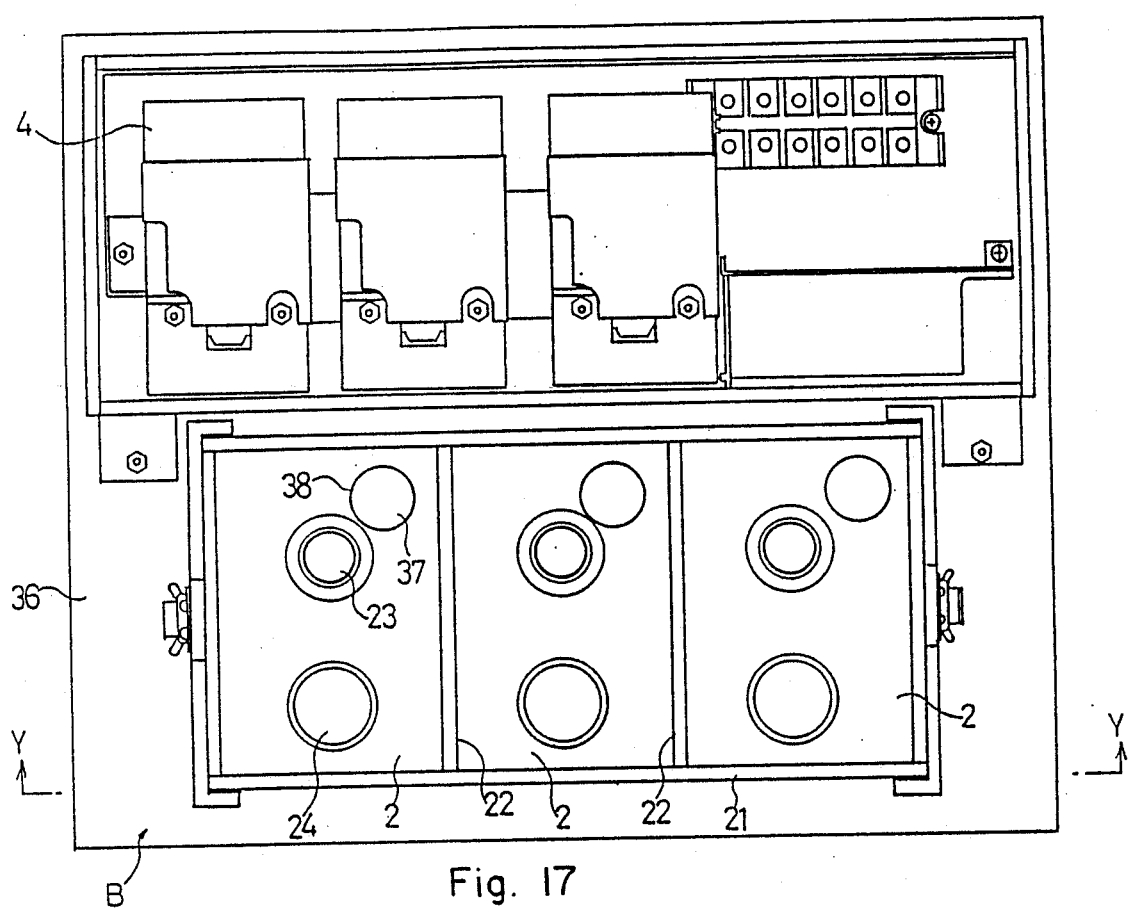
FIG. 17 is a plan view showing a practical example of the mist generator.
Figure 18:
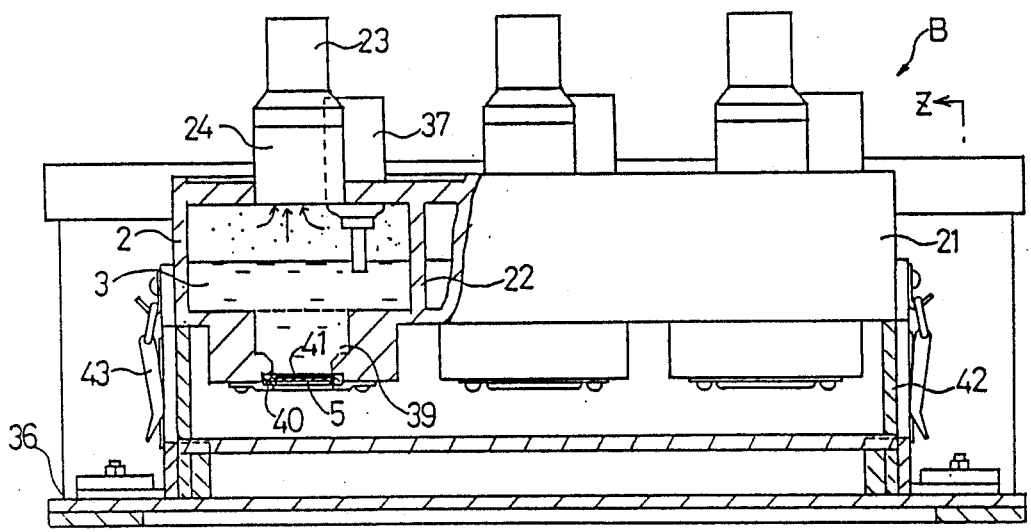
FIG. 18 is the partially cutaway sectional view taken along line Y—Y in FIG. 17.
Figure 19:
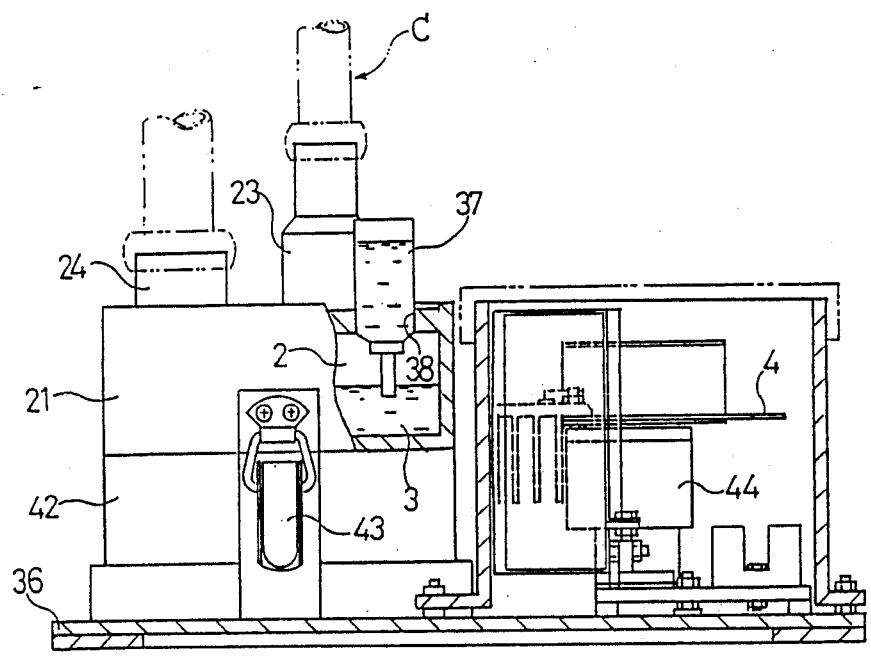
FIG. 19 is the partially cutaway section view taken along line Z—Z in FIG. 18.

FIG. 17 to FIG. 19 disclose another practical example using a concrete structure with the mist generator (B) wherein a plurality of mist generators (2) which contain the water solution of the metallic chloride (3) are arranged in parallel. A plurality of airtight containers (2) (three units in the drawings) and their related ultrasonic wave generators (4) are arranged on the same basement floor (36).

These three units of airtight containers (2) consist of one case shaped container (21) that is divided into three compartments in the interior by partitions (22), and the gas feeding pipe line or the premixing air supply pipe line is connected with each airtight container (2) on the upper surface, thereof. Each fresh air intake (23) for premixing air, the outlet (24) for the premixed gases and the supply inlet (38) for the water solution of e metallic chloride to be put in a service container (37) to automatically supply the water solution of the metallic chloride are arranged on the surface of the case shaped container (21). Further, the bottom of the each airtight container (2) is formed downwardly in a pit section (39) and a resonator (5) is arranged to close the openings (40) at the bottom of the pit section (39).

The surface of the resonator (5) is coated by titanic foil (41) (the thickness of the foil to be 20 microns). Coating the surface of the resonator (5) by the titanic foil prevents the resonator (5) from corrosion caused by contact with the water solution of the metallic chloride (3).

Therefore, the mist generator (B) is not as complex in structure as that shown in the fourth practical example.

The above airtight container (2) which is formed by division into compartments is detachably placed on a case shaped base (42) so as to close the upper opening of the case shaped base (42) by suitable fixing parts (43).

This structure has, therefore, the advantage that the base (42) receives any leakage of the water solution of the metallic chloride (3) if the water solution (3) is leaked carelessly from the fixing portion between the resonator (5) and the bottom and wherein overflow of the water solution to the outside is prevented, so that it is possible to prevent any damage to the electric parts of, for example, the ultrasonic wave generator (4) from corrosion caused by the leakage of the water solution.

Further, the ultrasonic wave generator (4) shown in the drawings has a down transformer because the system can be used with AC 50 V. However, it also may be used with AC 100 V, etc.

As described above, the system of the present invention using the gas flame for the appreciation or ornamentation will be useful as an illumination of entertainment in the outdoors or as a torch lamp or a campfire serving both as a lighting and an ornamentation or in a beer hall, etc., in the outdoors, and as an interior display device or an ornamental device, and as an appreciative device such as the Kaleidoscope system and the like.

What is claimed:

1. A system utilizing a gas flame for appreciation or ornamentation said system comprising
   at least one gas burner having a nozzle adapted to display a desired design or pattern by the flame emitted from the nozzle;
   at least one airtight container for storing an aqueous solution of a metallic compound so that a space exists above the surface of the water solution;
   at least one ultrasonic wave generator having a resonator located at the bottom of said airtight container to vibrate said solution, thereby atomizing at least part of said solution to generate a mist within said space; and
   a first pipe line connecting said space in said at least one container with said at least one burner so that mist generated within said space is supplied to said burner.

2. The system according to claim 1, further comprising a gas pipe line connected to said space in said container, whereby gas and said mist are supplied together to said burner.

3. The system according to claim 1, further comprising a gas pipe line connected to said burner and an air pipe line connected to said space in said container, whereby air from said air pipe line mixes with said mist and is supplied to said burner through said first pipe line.

4. The system according to claim 1, comprising a plurality of airtight containers, each container including an ultrasonic wave generator.

5. The system according to claim 1, wherein said metallic compound is a metallic chloride.

6. A system utilizing a gas flame for appreciation or ornamentation, said system comprising:
   at least one gas burner having a nozzle adapted to display a desired design or pattern by the flame emitted from the nozzle;
   at least one airtight container for storing an aqueous solution of a metallic compound;
   at least one ultrasonic wave generator having a resonator positioned in said airtight container to vibrate the solution to generate a mist to be supplied to said burner.

7. The system according to claim 6, comprising a plurality of airtight containers, each container including an ultrasonic wave generator and resonator.

8. The system according to claim 7, wherein each of said containers contains an aqueous solution of a different metallic compound, and wherein each ultrasonic wave generator is selectively operated.

9. The system according to claim 6, wherein said metallic compound is a metallic chloride.

10. A system utilizing a gas flame for appreciation or ornamentation, said system comprising:
    at least one gas burner having a nozzle adapted to display a desired design or pattern by the flame emitted from the nozzle;
    a plurality of airtight containers for storing an aqueous solution of a metallic compound so that a space exists above the surface of the water solution;
    a plurality of ultrasonic wave generators, each having a resonator to vibrate said solution, thereby atomizing at least part of said solution to generate a mist within said space; and
    a first pipe line connecting said space in said containers with said at least one burner so that mist generated within said space is supplied to said burner.

11. The system according to claim 10, wherein each of said containers contains a water solution of a different metallic compound, and wherein each said ultrasonic wave generator is selectively operated.

12. The system according to claim 10, wherein each said resonator is respectively located at the bottom of a respective airtight container.

13. The system according to claim 10, further comprising a water container adapted to contain distilled water for housing each said airtight container, the resonator of each said ultrasonic wave generator being located at the bottom of said water container, wherein each said airtight container is adapted to float on the distilled water, whereby waves generated by each said ultrasonic wave generator will pass through the distilled water and the bottom of each said airtight container.

14. The system according to claim 10, wherein a resonator is located at the bottom of each airtight container.

15. The system according to claim 10, wherein said metallic compound is a metallic chloride.

16. A system utilizing a gas flame for appreciation or ornamentation, said system comprising:
    at least one gas burner having an nozzle adapted to display a desired design or pattern by the flame emitted from the nozzle;
    at least one airtight container for storing an aqueous solution of a metallic compound so that a space exists above the surface of the water solution;
    at least one ultrasonic wave generator having a resonator to vibrate said solution, thereby atomizing at least part of said solution to generate a mist within said space;
    a water container adapted to contain distilled water for housing said airtight container, the resonator of said ultrasonic wave generator being located at the bottom of said water container, wherein said airtight container is adapted to float on the distilled water, whereby waves generated by said ultrasonic wave generator will pass through the distilled water and the bottom of said airtight container; and
    a first pipe line connecting said space in said at least one container with said at least one burner so that mist generated within said space is supplied to said burner.

17. The system according to claim 16, wherein said metallic compound is a metallic chloride.

* * * * *